(12) United States Patent
Umeyama

(10) Patent No.: US 7,903,142 B2
(45) Date of Patent: Mar. 8, 2011

(54) DIGITAL STILL CAMERA WITH PRINT-ORDER INFORMATION

(75) Inventor: Kazuya Umeyama, Tokyo (JP)

(73) Assignee: Nikon Corporation, Tokyo (JP)

( * ) Notice: Subject to any disclaimer, the term of this patent is extended or adjusted under 35 U.S.C. 154(b) by 818 days.

(21) Appl. No.: 11/192,131

(22) Filed: Jul. 29, 2005

(65) Prior Publication Data

US 2005/0259154 A1 Nov. 24, 2005

Related U.S. Application Data

(63) Continuation of application No. PCT/JP2004/001575, filed on Feb. 13, 2004.

(30) Foreign Application Priority Data

Feb. 14, 2003 (JP) .................................. 2003-036970

(51) Int. Cl.
*H04N 5/225* (2006.01)
*H04N 5/222* (2006.01)
*H04N 5/76* (2006.01)

(52) U.S. Cl. ............... 348/207.2; 348/333.02; 348/231.3

(58) Field of Classification Search ............... 348/207.2, 348/231.99, 231.3, 231.5
See application file for complete search history.

(56) References Cited

U.S. PATENT DOCUMENTS

| | | | |
|---|---|---|---|
| 5,633,678 A | 5/1997 | Parulski et al. | |
| 6,201,571 B1 | 3/2001 | Ota | |
| 6,563,542 B1 * | 5/2003 | Hatakenaka et al. | .... 348/333.02 |
| 6,850,273 B1 * | 2/2005 | Yoshida et al. | ............ 348/231.3 |
| 7,019,779 B1 * | 3/2006 | Suzuki | ...................... 348/333.02 |
| 7,158,175 B2 * | 1/2007 | Belz et al. | ................... 348/231.3 |
| 7,271,932 B2 * | 9/2007 | Izumi | .............................. 358/1.9 |
| 7,557,937 B2 * | 7/2009 | Song | .............................. 358/1.1 |
| 2002/0021359 A1 * | 2/2002 | Okamoto | ....................... 348/222 |
| 2002/0054168 A1 | 5/2002 | Ohmura | |
| 2002/0176109 A1 * | 11/2002 | Matsumoto | ................... 358/1.15 |
| 2003/0020813 A1 * | 1/2003 | Iida | ............................ 348/207.1 |
| 2003/0081237 A1 * | 5/2003 | Ogiwara et al. | ............. 358/1.14 |
| 2003/0122950 A1 * | 7/2003 | Anderson | ................ 348/333.02 |
| 2004/0179115 A1 * | 9/2004 | Tomat et al. | ................ 348/231.6 |
| 2005/0254089 A1 * | 11/2005 | Oliver et al. | .................. 358/1.16 |
| 2007/0139705 A1 * | 6/2007 | Ogiwara et al. | ............. 358/1.15 |

FOREIGN PATENT DOCUMENTS

| | | |
|---|---|---|
| JP | A 08-251359 | 9/1996 |
| JP | A 09-331499 | 12/1997 |
| JP | A 10-056525 | 2/1998 |
| JP | B 3037140 | 2/2000 |
| JP | A 2002-314931 | 10/2002 |

* cited by examiner

*Primary Examiner* — Kelly L Jerabek
(74) *Attorney, Agent, or Firm* — Oliff & Berridge, PLC

(57) ABSTRACT

A digital still camera of the invention includes: an image-capturing unit which generates an image; a selecting unit which decides whether a date where the generating is done is to be written onto the image; a writing unit which writes the date when the selecting unit decides that the date is to be written; a creating unit which creates print-order information; a determining unit which determines whether the image has the date thereon, when the creating unit creates the print-order information for the image; a changing unit which deletes the date from the print-order information when the determining unit determines that the image has the date thereon, and the print-order information includes the date; and a recording unit which records the image and the print-order information, associating them with each other. Therefore, it can avoid a problem in printing the date, and properly set print-order information with simple operation.

10 Claims, 3 Drawing Sheets

F I G. 1
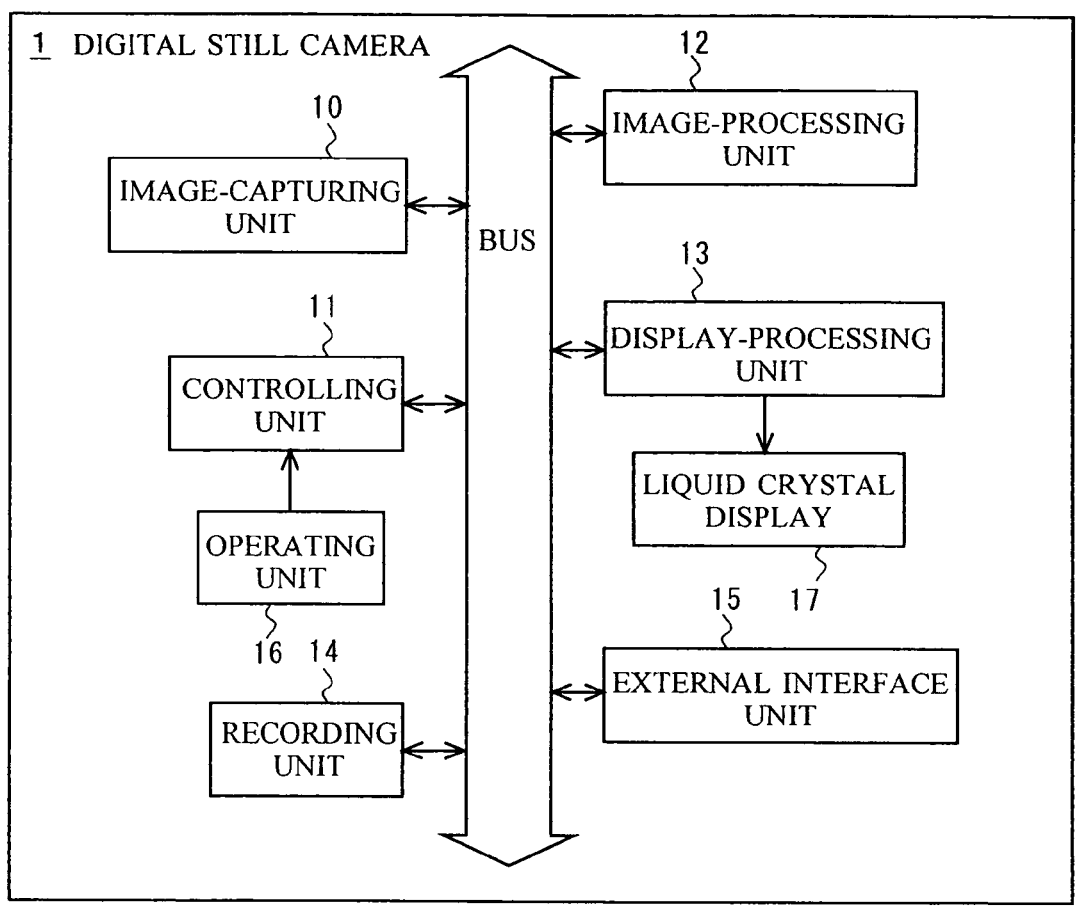

17

SETTING OF PRINT-ORDER INFORMATION

PRINT ONE COPY OF EVERY IMAGE

DATE PRINTING

PHOTOGRAPHING INFORMATION PRINTING

IF IT IS OK, PRESS DECISION BUTTON

DIGITAL STILL CAMERA WITH PRINT-ORDER INFORMATION

CROSS REFERENCE TO RELATED APPLICATION

This application is a continuation application of International Application PCT/JP 2004/001575, filed on Feb. 13, 2004, and designating the U.S., and claims the benefit of priority from Japanese Patent Application No. 2003-36970, filed on Feb. 14, 2003, the entire contents of which are incorporated herein by reference.

BACKGROUND OF THE INVENTION

1. Field of the Invention

The present invention relates to a digital still camera which captures a subject to generate an image.

2. Description of the Related Art

Some conventional digital still cameras can write the date and time of photographing and the like in an image generated by image capturing as disclosed in Japanese Patent Gazette No. 3037140. Moreover, some other digital still cameras create tag information for each image generated by image capturing and records it together with the image. Such tag information includes print-order information (for example, an order to print the date and time of photographing with the image, an order for the number of copies to be printed, and so on) in addition to photographing conditions.

However, the above-described conventional digital still cameras may have a problem that the date is printed at two positions (or overlappingly) on the image when the image generated by image capturing has the date and time of photographing written thereon and the print-order information of the tag information contains an order to print the date and time of photographing, for example.

SUMMARY OF THE INVENTION

In view of solving the above-described problem, an object of the present invention is to provide a digital still camera capable of properly setting print-order information with a simple operation.

A digital still camera of the present invention includes: an image-capturing unit which captures a subject to generate an image; a selecting unit which decides whether a date on which the capturing is done is to be written onto the image generated by the image-capturing unit; a writing unit which writes the date when the selecting unit decides that the date is to be written; a creating unit which creates print-order information for the image; a determining unit which determines whether the image has the date written thereon by the writing unit, when the creating unit creates the print-order information for the image; a changing unit which deletes the date from the print-order information when the determining unit determines that the image has the date written thereon, when the print-order information includes the date of the capturing; and a recording unit which records the image and the print-order information, associating them with each other.

According to another aspect of the digital still camera of the present invention, it may be configured that, when the creating unit simultaneously creates the print-order information for plural images generated by the image-capturing unit, the determining unit performs the determining for each of the plural images, and when the plural images include an image determined by the determining unit to have the date written thereon, and the print-order information for the image includes the date of the capturing, the changing unit deletes the date from the print-order information.

According to another aspect of the digital still camera of the present invention, it may be configured to include: an image-capturing unit which captures a subject to generate an image; a selecting unit which decides whether a date on which the capturing is done is to be written onto the image generated by the image-capturing unit; a writing unit which writes the date when the selecting unit decides that the date is to be written; a creating unit which creates print-order information for the image; a determining unit which determines whether the image has the date written thereon by the writing unit, when the creating unit creates the print-order information for the image; and a recording unit which records the print-order information and the image, associating them with each other, when the determining unit determines that the image does not have the date written thereon, and records the print-order information excluding the date of the capturing and the image, associating them with each other, when the determining unit determines that the image has the date written thereon and the print-order information includes the date of the capturing.

According to another aspect of the digital still camera of the present invention, it may configured that, when the creating unit simultaneously creates the print-order information for plural images generated by the image-capturing unit, the determining unit performs the determining for each of the plural images, and when the plural images include an image determined by the determining unit to have the date written thereon, and the print-order information for the image includes the date of the capturing, the recording unit records the print information excluding the date of the capturing and the image, associating them with each other.

According to another aspect of the digital still camera of the present invention, it may be also configured to further include a generating unit which generates at least one of an image for composition check-up at a time of image capturing, an image for captured image check-up, and a thumbnail image for a list display, in which the writing unit writes the date onto at least one of the image for composition check-up, the image for captured image check-up, and the thumbnail image generated by the generating unit.

Another digital still camera of the present invention includes: an image-capturing unit which captures a subject to generate an image; a selecting unit which decides whether a date on which the capturing is done is to be written onto the image generated by the image-capturing unit; a writing unit which writes the date when the selecting unit decides that the date is to be written; a creating unit which creates print-order information for the image; a determining unit which determines whether the image has the date written thereon by the writing unit, when the creating unit creates the print-order information for the image; a setting unit which sets the print-order information so that the date printing according to the print-order information is not to be performed when the determining unit determines that the image has the date written thereon; and a recording unit which records the image and the print-order information, associating them with each other.

Further, another digital still camera of the present invention includes: an image-capturing unit which captures a subject to generate an image; a selecting unit which decides whether a date on which the capturing is done is to be written onto the image generated by the image-capturing unit; a writing unit which writes the date when the selecting unit decides that the date is to be written; a creating unit which creates print-order information for the image; a determining unit which determines whether the image has the date written thereon by the writing unit, when the creating unit creates the print-order information for the image; a setting unit which sets the print-order information so that a position at which the date is printed according to the print-order information is changed, when the determining unit determines that the image has the date written thereon; and a recording unit which records the image and the print-order information, associating them with each other.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 1 is a block diagram showing the configuration of a digital still camera of the present embodiment;

BEST MODE FOR CARRYING OUT THE INVENTION

Figure 2:
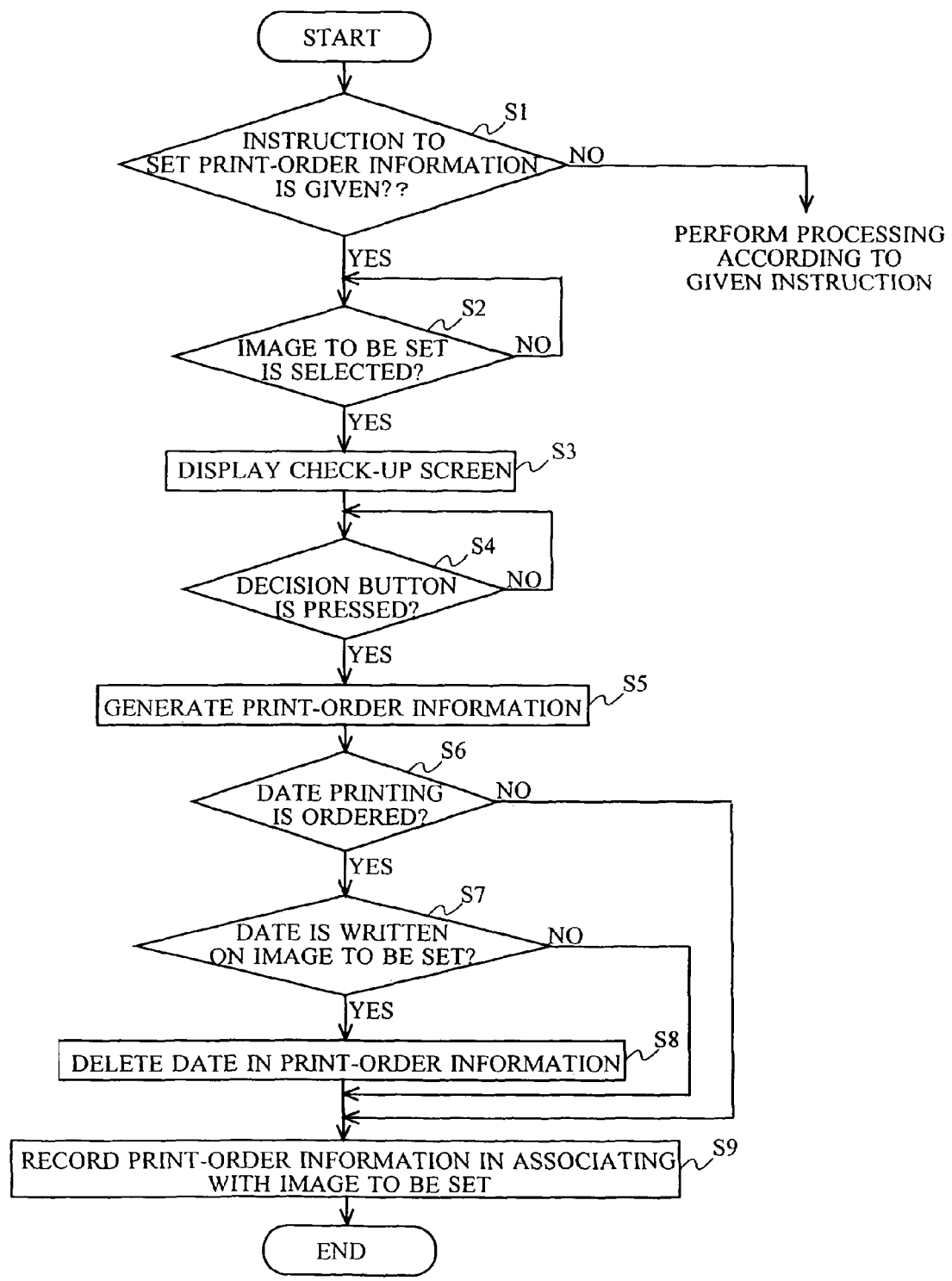
FIG. 2 is a flowchart showing the operation of a controlling unit in the digital still camera of the present embodiment.

A detailed description of an embodiment of the present invention will be given below.

FIG. 1 is a block diagram showing the configuration of a digital still camera in the embodiment of the present invention.

As shown in FIG. 1, a digital still camera 1 includes an image-capturing unit 10, a controlling unit 11, an image-processing unit 12, a display-processing unit 13, and a recording unit 14, and a not-shown external interface unit 15 which interfaces with external devices (such as a computer and a printer). They are interconnected via a bus.

Note that the image-capturing unit 10 includes a lens, various sensors which measure the brightness of a subject and photographing distance, an image-capturing device, an A/D converter, and so on which are not shown.

Moreover, the digital still camera 1 includes an operating unit 16 including a power button, a release button, a decision button related to an operation to set print-order information later described, and so on which are not shown, and a liquid crystal display 17. In FIG. 1, an output of the operating unit 16 is connected to the controlling unit 11, and an output of the display-processing unit 13 is connected to the liquid crystal display 17.

Further, the controlling unit 11 has programs to realize processing of the digital still camera 1 recorded in advance thereon. In the digital still camera 1, the photographing of a subject, reproduction of a recorded image, and so on are performed by executing the programs by the controlling unit 11.

Furthermore, the digital still camera 1 is connectable with the external computer and printer via the external interface unit 15.

Moreover, the digital still camera 1 is compatible with DPOF (Digital Print Order Format). DPOF is one of recording formats for digital still cameras and makes it possible to record print-order information for an image generated by the digital still camera 1 together with the image. According to the DPOF print-order information, it is possible to makes an order to print the date and time and the like together with the image, an order to set the number of copies to be printed, and so on. It is also possible to set the position where the date and time is printed at any of upper, lower, left, and right ends of the image.

Such print-order information is set by a user via the operating unit 16 during a reproducing mode. The order to print the date and time or the like with the image can be set for each image, however, it is collectively set for all images in the present embodiment, and the order for the number of copies to be printed is set for each image.

Furthermore, the digital still camera 1 can write the date and time of photographing and the like onto the image in addition to the setting of the above-described print-order information. An order to write the date and time and the like onto the image is set via the operating unit 16 before the photographing.

Namely, the digital still camera 1 has two ways to put the date on the image. When setting the order before photographing, the user can set the order to write the date on the image as described above, and when setting the order after photographing, the user can set the above-described DPOF print information.

In the digital still camera 1 having such a configuration as described above, when the power button not shown is turned on, the controlling unit 11 senses the turning-on of the power button and instructs the respective units to start image capturing and display a through image ("an image for composition check-up" in CLAIMS). The controlling unit 11 writes the date on the through image when the through image is generated via the respective units. The writing of the date is realized by superimposing an image of the date on an image captured by the image-capturing unit 10 via the image-processing unit 12. The controlling unit 11 performs the writing of the date every time the through image is updated.

Thereafter, when the execution of a photographing mode is instructed by the user via the operating unit 16 and the release button not shown of the operating unit 16 is pressed, the controlling unit 111 captures a subject via the image-capturing unit 10, subjects it to predetermined image processing via the image-processing unit 12, and records it in the recording unit 14. Incidentally, the controlling unit 11 records an image displayed on the liquid crystal display 17 when the release button is pressed as a quick view image ("an image for captured image check-up" in CLAIMS) in the recording unit 14 and displays it on the liquid crystal display 17 via the display-processing unit 13. Moreover, the controlling unit 11 performs predetermined thinning processing on the quick view image to generate a thumbnail image via the image-processing unit 12 and records it with the above-described quick view image in the recording unit 14. The controlling unit 11 writes the date on the quick view image in the same manner as the above-described through image, and further writes the date also on the thumbnail image. To avoid a deterioration in the image of a date portion thereof, the date is written on the thumbnail image by superimposing after thinning.

On the other hand, when the execution of the reproducing mode is instructed by the user via the operating unit 16, the controlling unit 11 reads the image from the recording unit 14 according to the instruction and displays the read image on the liquid crystal display 17 via the display-processing unit 13. On this occasion, when a list display is instructed, the controlling unit 11 reads and displays the above-described thumbnail image, and when a one-piece display is instructed, it reads and displays the above-described quick view image.

The operation of the controlling unit 11 when print information is set in the digital still camera 1, which is a characteristic of the present invention, will be described below.

When the execution of the reproducing mode is instructed by the user via the operating unit 16, in step S1, the controlling unit 11 determines whether the setting of the print-order information is instructed by the user via the operating unit 16. If the setting of the print-order information is instructed, the controlling unit 11 proceeds to step S2, and if the setting of the print-order information is not instructed, the controlling unit 11 performs processing according to the contents of the instruction (for example, image deletion, or the like).

In step S2, the controlling unit 11 determines whether an image to be set is selected by the user via the operating unit 16. The user can select one to all from the images as the object of the print-order information setting. The controlling unit 11 repeats step S2 until the image to be set is selected, and proceeds to step S3 if it is selected.

Figure 3:
FIG. 3 is a diagram showing an example of a check-up screen on a liquid crystal display in the present embodiment.
Figure 3:

In step S3, the controlling unit 11 displays a predetermined check-up screen on the liquid crystal display 17 via the display-processing unit 13. FIG. 3 shows an example of the check-up screen. FIG. 3 shows an example where all the images are objects of the setting, the number of copies to be printed for every image is one, and the order to print the date with the image ("date printing" in FIG. 3) is given.

In step S4, the controlling unit 11 determines whether the decision button not shown of the operating unit 16 is pressed by the user. The controlling unit 11 repeats step S4 until the decision button in pressed, and if the decision button is pressed, proceeds to step S5. Incidentally, a case where the decision button is not pressed means a case where the user is setting the print-order information via the operating unit 16.

In step 55, the controlling unit 11 creates the print-order information. Namely, the controlling unit 11 creates print-order information set when the decision button is pressed for each image to be set.

In step S6, the controlling unit 11 determines whether the date printing is ordered in the print-order information. If the date printing is ordered, the controlling unit 111 proceeds to step S7, and if the date printing is not ordered, the controlling unit 11 proceeds to step S9.

In step S7, the controlling unit 11 determines whether the date is written onto the image to be set. The controlling unit 11 proceeds to step S8 when the setting to write the date in the image is done and the date is already written onto the image to be set before photographing. When the date is not written onto the image to be set, the controlling unit 111 proceeds to step S9.

In step S8, the controlling unit 11 deletes a portion concerning the order of date printing from the print-order information created in step S5.

In step S9, the controlling unit 11 records the print-order information for the recording unit 14 in association with the image to be set, and ends a series of processes.

Note that, when the number of images to be set is plural, the controlling unit 11 performs the processing from step S6 to step S9 on each of the images. As a result, in step S9, the print-order information for each of the images to be set is recorded.

As described above, according to the present embodiment, when the print-order information is set, it is determined whether the date is written onto the image to be set, and if the date is written, the date included in the print-order information is deleted. This makes it possible to avoid a problem that the date writing into the image and the date printing of the date according to the print-order information are both performed so that the date is printed at two positions (or overlappingly) on the image.

Moreover, according to the present embodiment, when the print-order information is created for plural images, each of the images is determined whether or not it has the date written thereto, and if so, the date included in the print-order information for the image is deleted. Therefore, even if some of the images have the date written thereto and others do not, the print order can be made for each of the images one by one. This makes it possible to simplify a user's operation and properly add the date with a simple operation.

Further, according to the present embodiment, the date is written onto the through image. Therefore, when determining the composition, the user can determine the composition of an image in such a manner that the date portion and the subject do not overlap. Furthermore, according to the present embodiment, the date is also written onto the quick view image and the thumbnail image. Hence, at the time of setting the print-order information, the user can visually see whether the image has the date thereon, thereby avoiding a setting error.

The present embodiment has described the example in which it is determined whether the image to be set has the date written when the print-order information is set, and if it does, the date included in the print-order information is deleted. However, only the print-order information except the date may be recorded in association with the image when the print-order information is recorded (step S9 in FIG. 2). Also in this case, similarly to the case where the date is deleted, it is possible to avoid the problem that the date is printed at two positions (or overlappingly) on the image because both of the writing of the date to the image itself and the printing of the date according to the print-order information are performed. Moreover, also when the print-order information is created for plural images, similarly to the case where the date is deleted, it is possible to simplify the user's operation and properly add the date with a simple operation.

Moreover, in the present embodiment, the description is given on the order to print the date as an example of the print-order information, but other print-order information may be used. For example, an order to print photographing information (kinds of a shutter speed and a scene mode, and so on) may be made according to the print-order information.

Further, in the present embodiment, the description is given on the DPOF as an example of the print-order information, but other print-order information may be used.

Furthermore, the present embodiment has described the example in which the date in the print-order information is deleted when the image to be set has the date written thereon and the print-order information of the image includes an order for the date printing.

However, it is also possible to change the printing position instead of deleting the information when the image to be set has the date written thereon and the print-order information contains an order for the printing of information other than the date printing.

Moreover, the present embodiment has described the example in which the quick view image and the thumbnail image are generated based on the through image, but these images may be generated based on the image obtained by image capturing upon the press to the release button.

The invention is not limited to the above embodiments and various modifications may be made without departing from the spirit and scope of the invention. Any improvement may be made in part or all of the components.

What is claimed is:

1. A digital still camera, comprising:
   an image-capturing unit which captures a subject to generate a captured image;

a selecting unit which decides whether a date on which the capturing is done is to be written onto the captured image generated by the image-capturing unit;

a writing unit which writes an image of the date when the selecting unit decides that the date is to be written;

an inputting unit which collectively accepts a print-order to print the date with each captured image of a plurality of captured images captured by the image-capturing unit based on a single user operation;

a creating unit which creates print-order information for each of the plurality of the captured images according to the print-order accepted by the inputting unit;

a determining unit which sequentially determines whether each of the plurality of the captured images, having accepted the print-order, has thereon the date written by the writing unit, when the creating unit creates the print-order information for the captured image;

a changing unit which deletes from the print-order information the date for each of the captured images being determined by the determining unit as having the date written thereon and having the print-order information including the date of the capturing; and a recording unit which records the captured image and the print-order information, associating them with each other.

2. The digital still camera according to claim 1, further comprising a generating unit which generates at least one of an image for composition check-up at image capturing, an image for captured image check-up, and a thumbnail image for a list display, wherein the writing unit writes the date onto at least one of the image for composition check-up, the image for captured image check-up, and the thumbnail image generated by the generating unit.

3. An electronic apparatus, comprising:

an inputting unit which collectively accepts a print-order to print a date with each image of a plurality of images based on a single user operation;

a creating unit which creates print-order information for each of the plurality of the images according to the print-order accepted by the inputting unit;

a determining unit which sequentially determines whether each image of the plurality of the images, having accepted the print-order, has the date written thereon when the creating unit creates the print-order information for the image;

a changing unit which deletes the date from the print-order information for each of the images being determined by the determining unit as having the date written thereon and having the print-order information including the date;

a recording unit which records the image and the print-order information, associating the image and the print-order information with each other.

4. The electronic apparatus according to claim 3, further comprising:

a generating unit which generates at least one of an image for composition check-up at image capturing, an image for image check-up, and a thumbnail image for a list display, wherein the determining unit determines whether each of the image for composition check-up, the image for image check-up and the thumbnail image has the date written thereon.

5. An electronic apparatus, comprising:

an inputting unit which collectively accepts a print-order to print a date with each image of a plurality of images based on a single user operation;

a creating unit which creates print-order information for each of the plurality of the images according to the print-order accepted by the inputting unit;

a determining unit which sequentially determines whether each image of the plurality of the images, having accepted the print-order, has the date written thereon when the creating unit creates the print-order information for the image;

a recording unit which records the image and the print-order information, associating the image and the print-order information with each other when the determining unit determines that the image does not have the date written thereon, and records the print-order information excluding the date and the image, associating the date and the image with each other when the determining unit determines that the image has the date written thereon and the print-order information includes the date.

6. An electronic apparatus, comprising:

an inputting unit which collectively accepts a print-order to print a date with each image of a plurality of images based on a single user operation;

a creating unit which creates print-order information for each of the plurality of the images according to the print-order accepted by the inputting unit;

a determining unit which sequentially determines whether each image of the plurality of the images, having accepted the print-order, has the date written thereon when the creating unit creates the print-order information for the image;

a setting unit which sets the print-order information so that the date printing according to the print-order information is not to be performed, when the determining unit determines that the image has the date written thereon; and a recording unit which records the image and the print-order information, associating the image and the print-order information with each other.

7. An electronic apparatus, comprising:

an inputting unit which collectively accepts a print-order to print a date with each image of a plurality of images based on a single user operation;

a creating unit which creates print-order information for each of the plurality of the images according to the print-order accepted by the inputting unit;

a determining unit which sequentially determines whether each image of the plurality of the images, having accepted the print-order, has the date written thereon when the creating unit creates the print-order information for the image;

a setting unit which sets the print-order information so that a position at which the date is printed according to the print-order information is changed, when the determining unit determines that the image has the date written thereon; and a recording unit which records the image and the print-order information, associating the image and the print-order information with each other.

8. An electronic apparatus, comprising:

an inputting unit which collectively accepts a print-order to print a group I image with each image of a plurality of images based on a single user operation;

a creating unit which creates print-order information for each of the plurality of the images according to the print-order accepted by the inputting unit;

a determining unit which sequentially determines whether each image of the plurality of the images, having accepted the print-order, has the group I image written thereon, when the creating unit creates the print-order information for the image;

a changing unit which deletes the information about the group I image from the print-order information for each of the images being determined by the determining unit as having the group I image written thereon and having the print-order information including the information about the group I image print-order;

a recording unit which records the image and the print-order information, associating the image and the print-order information with each other.

9. An electronic apparatus, comprising:

an inputting unit which collectively accepts a print-order to print a group I image with each image of a plurality of images based on a single user operation;

a creating unit which creates print-order information for each of the plurality of the images according to the print-order accepted by the inputting unit;

a determining unit which sequentially determines whether each image of the plurality of the images, having accepted the print-order, has the group I image written thereon when the creating unit creates the print-order information for the image;

a recording unit which records the print-order information and the image, associating the image and the print-order information with each other, when the determining unit determines that the image does not have the group I image written thereon, and records the print-order information excluding the information about the group I image and the image, associating the group I image and the image with each other, when the determining unit determines that the image has the group I image written thereon and the print-order information includes the information about the group I image print-order.

10. An electronic apparatus, comprising:

an inputting unit which collectively accepts a print-order to print a group I image with each image of a plurality of first images based on a single user operation;

a creating unit which creates print-order information for each of the plurality of the first images according to the print-order accepted by the inputting unit;

a determining unit which sequentially determines whether each image of the plurality of the first images, having accepted the print-order, has the group I image written thereon when the creating unit creates the print-order information for the first image;

a setting unit which sets the print-order information so that a position at which a group II image is printed is changed to a position that does not overlap with a position at which the group I image is written, when the determining unit determines that the first image has the group I image written thereon and when print-order for the group II image is different from the print-order information for the group I image and is included in the print-order information; and a recording unit which records the first image and the print-order information, associating the image and the print-order information with each other.

* * * * *